Figure 1:
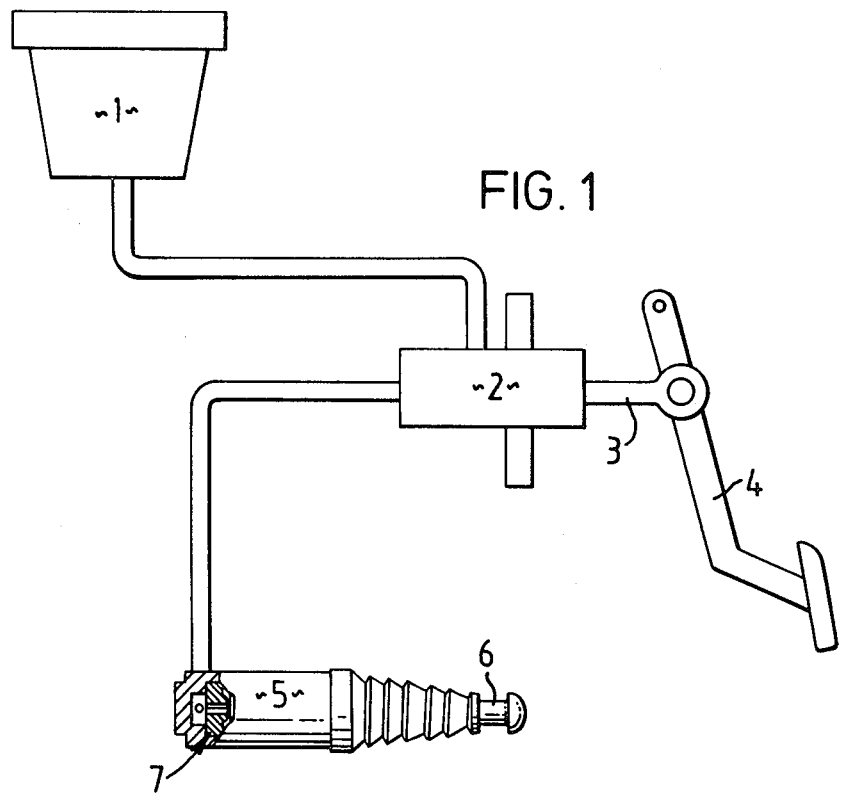

United States Patent [19]
Bainbridge

[11] Patent Number: 4,464,900
[45] Date of Patent: Aug. 14, 1984

[54] FLOW VALVE

[75] Inventor: Wilfred N. Bainbridge, Overthorpe, England

[73] Assignee: Autmotive Products plc, Leamington Spa, England

[21] Appl. No.: 372,753

[22] Filed: Apr. 28, 1982

[30] Foreign Application Priority Data

Apr. 30, 1981 [GB] United Kingdom ............... 8113368

[51] Int. Cl.³ ..................... F15B 7/00; F16K 15/14
[52] U.S. Cl. ....................................... 60/591; 137/843
[58] Field of Search ............ 60/591; 137/517, 543.19, 137/843, 859

[56] References Cited

U.S. PATENT DOCUMENTS

| | | | |
|---|---|---|---|
| 2,770,948 | 11/1956 | Porter | 60/591 |
| 2,908,109 | 10/1959 | Rotwein | 137/517 |
| 3,410,090 | 11/1968 | Thirion | 60/591 |
| 3,423,936 | 1/1969 | Stelzer | 60/591 |
| 3,526,437 | 6/1966 | Lewis | 60/591 |
| 3,807,430 | 4/1974 | Keller | 137/859 |
| 3,889,710 | 6/1975 | Brost | 137/843 |

FOREIGN PATENT DOCUMENTS

| | | |
|---|---|---|
| 718621 | 11/1954 | United Kingdom . |
| 0751289 | 6/1956 | United Kingdom ............... 137/859 |
| 827010 | 1/1960 | United Kingdom . |
| 1178994 | 1/1970 | United Kingdom . |
| 1222010 | 2/1971 | United Kingdom . |
| 1271268 | 4/1972 | United Kingdom . |

Primary Examiner—Robert E. Garrett
Assistant Examiner—H. Edward Li
Attorney, Agent, or Firm—Kemon & Estabrook

[57] ABSTRACT

The control valve comprises a member defining an orifice for fluid and a resilient plate arranged to control flow of fluid through the orifice by flexing movement relative to the orifice. The plate may comprise a disc which is freely movable between first and second stops. The plate is arranged to engage the first stop to control fluid flow in one direction through the orifice by said flexing movement and is arranged to engage the second stop to permit relatively greater flow when fluid flows in the opposite direction through the orifice.

6 Claims, 3 Drawing Figures

FLOW VALVE

The invention relates to a flow control valve and is particularly but not exclusively concerned with a valve for controlling fluid flow in a motor vehicle clutch control system.

Various types of control valves have been proposed hitherto for providing alternative paths for fluid through the valve so that the fluid will pass through the valve at different rates. Such valves are described for example in British patent specification Nos. 827,010 and 1,271,268. However, such valves provide flow paths of fixed cross section and their degree of flow control is thereby limited. An object of the present invention is to provide a flow control valve having improved flow control.

According to one aspect of the invention there is provided a control valve comprising a member defining an orifice for fluid and a resilient plate arranged to control flow of fluid through the orifice by flexing movement relative to the orifice.

Such an arrangment is particularly useful as the flexing of the plate provides a flow path of infinitely variable cross section. Also, the use of a plate is a particularly neat and inexpensive way of controlling flow through the orifice and is easier to manufacture and assemble than control valves which use, for example, relatively movable tapered components to control fluid flow.

In a preferred embodiment, the resilient plate is freely movable between first and second stop means, the plate being arranged to engage the first stop means to control flow in one direction through the orifice by said flexing movement and being arranged to engage the second stop means to permit relatively greater flow when fluid flows in the opposite direction through the orifice. With the plate arranged in that way, there is no need to provide any form of resilient mounting for biasing the plate in a particular direction as is necessary in the above mentioned U.S. Pat. No. 827,010 and also in British patent specification No. 1,222,010, the latter merely describing a form of non-return valve.

Preferably, the plate uncovers a port for the fluid when it engages the second stop means so that fluid can pass at the greater rate of flow directly from the orifice to the port, the plate being formed with an aperture through which fluid passes when the plate engages the first stop means during flow of fluid from the port to the orifice.

The resilient plate may be a disc which moves axially between said first and second stop means. The disc thus forms an extremely simple form of movable valve member and is highly advantageous in that respect over the more complex type of valve member.

The flexing characteristics of the plate may be such as to enable a substantially constant rate of fluid flow through the orifice in said one direction to be achieved during variations of fluid pressure acting on the plate.

According to another aspect of the invention there is provided a motor vehicle clutch control system comprising a reservoir for fluid, a master cylinder in fluid communication with the reservoir, a fluid operable slave cylinder driven by the master cylinder and which actuates the clutch, and a control valve according to any of the six immediately preceding paragraphs arranged to control fluid flow between the master and slave cylinders. Preferably, the control valve controls return fluid flow from the slave cylinder towards the master cylinder during engagement of the clutch by said flexing movement of the said plate.

Figure 2:
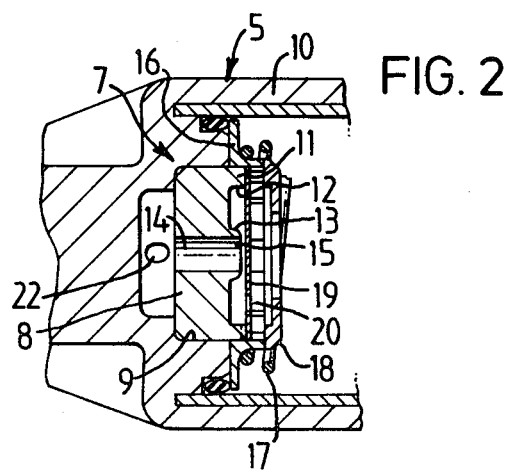
Figure 3:
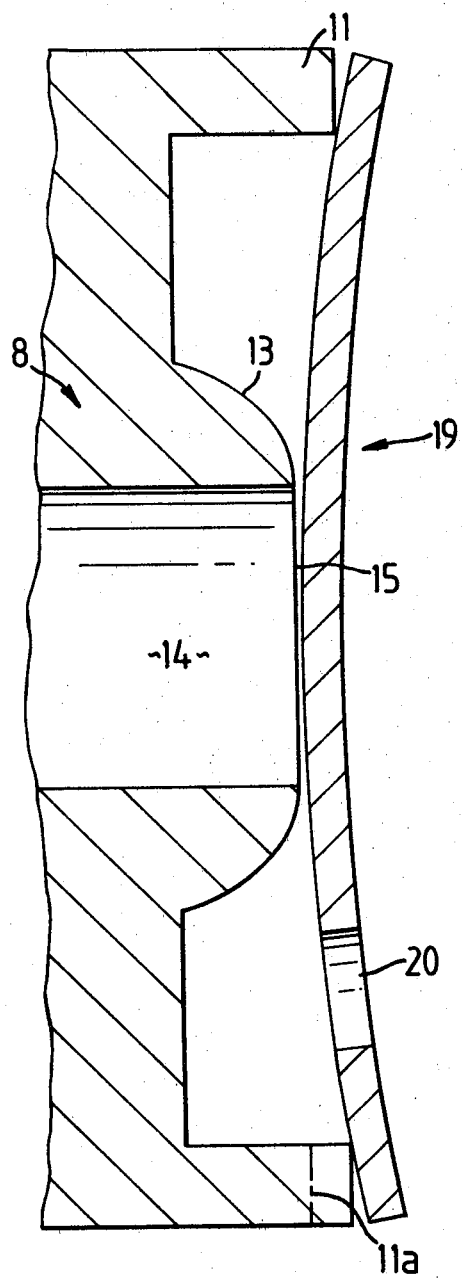

A control valve in accordance with the invention will now be described by way of example with reference to the accompanying drawings in which:

FIG. 1 is a diagrammatic view of a motor vehicle clutch control system incorporating a control valve in accordance with the invention, FIG. 2 is a longitudinal cross section through a preferred form of control valve in accordance with the invention and FIG. 3 is a longitudinal cross-section through part of the control valve shown in FIG. 2 drawn to a larger scale and showing the plate in a flexed condition.

In FIG. 1 a reservoir 1 for fluid is connected to a master cylinder 2 in the usual way. The master cylinder has the usual input rod 3 pivotally connected to a clutch pedal 4 of the vehicle and is connected to a slave cylinder 5. The slave cylinder has the usual output rod 6 for actuating a clutch (not shown) and is provided at its left hand end, as viewed in the drawing, with a control valve 7 in accordance with the invention.

Referring now to FIG. 2, the control valve comprises a cylindrical member 8 secured in a bore 9 in a housing 10 of the slave cylinder 5. The member 8 is formed with a counterbore 12 having a raised centre portion 13. The member 8 has an annular peripheral portion 11 which extends to the right beyond the right hand end of the centre portion 13. The member is also formed with an axial bore 14 which terminates at the centre portion 13 to form an orifice 15. The peripheral portion 11 of the member 8 projects slightly from the bore 9 and spigotally locates a castellated ring 16, the latter providing an abutment for a light coil spring 17 which extends between the ring and a piston (not showm) in the slave cylinder. The right hand end of the ring carries an annular retaining member 18 so as to form a cage for a metal disc 19 (consituting the aforesaid resilient plate). The disc 19 is formed with an aperture 20. The metal disc is freely movable axially between the right hand end of the peripheral portion 11 (which constitutes the aforesaid first stop means) and the left hand end of retaining member 18 (which constitutes the aforesaid stop means).

When the disc abuts the portion 11 it stands slightly clear of the orifice 15. During engagement of the clutch, the piston in the slave cylinder moves towards the control valve against the bias of spring 17 and urges fluid past the castellations in the ring 16 so that the disc 19 is urged against the peripheral portion 11. Fluid then flows to the orifice 15 via the aperture 20 in the disc and then passes through bore 14 and through an outlet/inlet 22 towards the master cylinder 2. The close proximity of the disc to the orifice 15 has a restricting effect on the fluid flow. Moreover, if the pressure of the fluid on the disc 19 rises to an undesirably high level, the pressure causes the disc to flex (FIG. 3) towards the orifice so as to creat additional restriction to the fluid flow. The flexing characteristics of the disc may be selected so that an increase in fluid pressure will be matched by flexing towards the orifice so that the rate of fluid flow through the orifice will remain substantially constant whatever the pressure on the right hand side of the plate. By using a resilient disc, the aperture 20 and the spacing between the disc 19 and orifice 15 can be such as to allow normal fast gear changes whilst allowing the flow of fluid to be controlled by flexing of the disc plate to prevent instantaneous full engagement of the clutch. During disengagement of the clutch, fluid enters the bore 14 from the outlet/inlet 22 and moves the disc 19 to the right engagement with retainer 18. Fluid can then flow at a relatively greater rate directly from the orifice 15 and past the castellations in ring 16 as the distance between the orifice and the disc is increased considerably.

Although specific reference has been made to the use of an aperture 20 in the disc 19, an alternative path may be used to provide restricted fluid flow during engagement of the clutch. For example instead of aperture 20 the peripheral portion 11 may be formed with a radial groove 11a as indicated by a broken line in FIG. 3.

The use of a simple disc 19 enables the valve to be produced economically and assembly is particularly straightforward.

Although the control valve intended for use in a motor vehicle clutch control system, it could be used in other fluid systems where similar flow control is required.

If desired, the member 8 could be formed integrally with the housing 10.

The term "resilient plate" as used herein includes any form of plate-like member, sheet or flexible membrane manufactured from a material having resilient properties.

What I claim as my invention and desire to secure by Letters Patent in the United States is:

1. A control valve comprising a member defining an orifice for fluid, a resilient plate arranged to control flow of fluid through the orifice by flexing movement relative to the orifice, first and second stop means between which said resilient plate is freely movable, said plate being arranged to engage said first stop means to control flow in one direction through the orifice by said flexing movement and being arranged to engage the second stop means to permit relatively greater flow when fluid flows in the opposite direction through the orifice and a port for the fluid arranged to be uncovered by the plate when the plate engages the second stop means so that fluid can pass at a greater rate of flow directly from the orifice to the port, the plate being formed with an aperture through which fluid passes when the plate engages the first stop means during flow of fluid from the port to the orifice.

2. A motor vehicle clutch control system comprising a reservoir for fluid, a master cylinder in fluid communication with the reservoir, a clutch for actuating said master cylinder, a fluid operable slave cylinder driven by the master cylinder and which actuates the clutch, and a control valve arranged to control fluid flow between the master and slave cylinders, said control valve comprising a member defining an orifice through which the fluid flows, a resilient plate arranged to control flow of fluid through the orifice by flexing movement relative to the orifice, first and second stop means between which said resilient plate is freely movable, said plate being arranged to engage said first stop means to control flow in one direction through the orifice by said flexing movement and being arranged to engage the second stop means to permit relatively greater flow when fluid flows in the opposite direction through the orifice and a port for the fluid arranged to be uncovered by the plate when the plate engages the second stop means so that fluid can pass at a greater rate of flow directly from the orifice to the port, the plate being formed with an aperture through which fluid passes when the plate engages the first stop means during flow of fluid from the port to the orifice.

3. A motor vehicle clutch control system according to claim 2 in which the control valve controls return fluid flow from the slave cylinder towards the master cylinder during engagement of the clutch by flexing movement of said plate.

4. A control valve comprising a member defining an orifice for fluid, a resilient plate arranged to control flow of fluid through the orifice by flexing movement relative to the orifice, first and second stop means between which said resilient plate is freely movable, said plate being arranged to engage said first stop means to control flow in one direction through the orifice by said flexing movement and being arranged to engage the second stop means to permit relatively greater flow when fluid flows in the opposite direction through the orifice, the amount of flexing movement of said plate being dependent on the pressure of the fluid acting on the plate so that an increase in pressure with fluid flowing in said one direction will cause the plate to decrease the distance between the plate and the orifice.

5. A control valve according to claim 4 in which the flexing characteristics of the plate enable a substantially constant rate of fluid flow through the orifice in said one direction to be achieved during variations in fluid pressure acting on the plate.

6. A control valve comprising a member defining an orifice for fluid, a resilient plate arranged to control flow of fluid through the orifice by flexing movement relative to the orifice, first and second stop means between which said resilient plate is freely movable, said plate being arranged to engage said first stop means to control flow in one direction through the orifice by said flexing movement and being arranged to engage the second stop means to permit relatively greater flow when fluid flows in the opposite direction through the orifice, the orifice defining member comprising a cylindrical member having an end surface formed with a peripheral portion defining said first stop means and a raised center portion, said member being formed with an axial bore which terminates at the raised center portion to define said orifice, said peripheral portion of said cylindrical member comprising an annular projection extending axially of said member, said first stop means being defined by an end surface of said projection which is positioned axially beyond said orifice.

* * * * *